Aug. 16, 1938.   W. L. McGRATH   2,127,086
HOSE COUPLING
Filed May 20, 1937

Witness:
Burrell Jones

INVENTOR.
William L. McGrath
BY Winton S. Jones.
ATTORNEY.

Patented Aug. 16, 1938

2,127,086

UNITED STATES PATENT OFFICE 2,127,086

HOSE COUPLING

William L. McGrath, Elmira, N. Y., assignor to Eclipse Machine Company, Elmira, N. Y., a corporation of New York Application May 20, 1937, Serial No. 143,748

6 Claims. (Cl. 285—168)

The present invention relates to a hose coupling and more particularly to a quick detachable coupling for vacuum lines.

Various forms of quick detachable couplings for hose lines have been developed which perform their functions more or less efficiently. It has been found difficult, however, to construct a quick detachable coupling for a vacuum hose line such as a vacuum brake line for automobile trailers, which is secure against accidental parting and will remain tight over long periods of use.

It is an object of the present invention to provide a novel quick detachable coupling for vacuum hose lines which is efficient and reliable in operation while being simple and economical in construction.

It is another object to provide such a device which is self-sealing in its action so as to prevent leakage in spite of long and hard usage.

It is a further object to provide such a device which may be readily coupled and uncoupled in spite of adverse conditions such as poor accessibility and the presence of mud or ice.

It is another object to provide such a device which is not subject to loosening through vibration and/or tension of the line.

Figure 1:
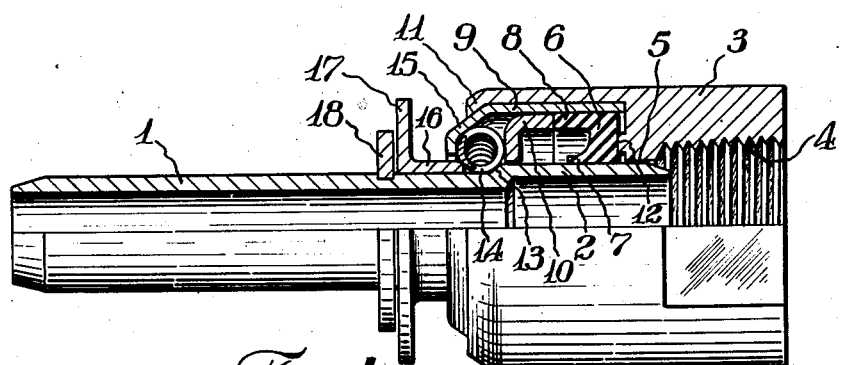
Figure 2:
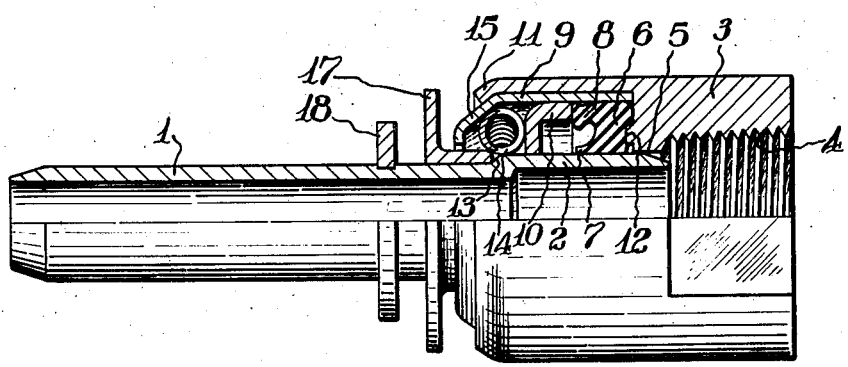

Further objects and advantages will be apparent from the following description taken in connection with the accompanying drawing in which:

Fig. 1 is a side elevation partly in section of a preferred embodiment of the invention showing the parts in coupled and locked relation; and Fig. 2 is a similar view showing the locking means released so as to permit parting of the coupling.

Referring first to Fig. 1 of the drawing, there is illustrated a tubular nipple 1 having a smooth cylindrical portion 2 adapted to be received by a socket member 3 which is threaded at 4 for attachment to a vacuum line.

Socket 3 is provided with a bearing surface 5 adapted to receive the end of the cylindrical portion 2 of the nipple, and carries adjacent thereto a self-sealing packing member 6 of suitable yielding material such as rubber or the like in the form of an annular collar having an inner flange 7 adapted to bear on the cylindrical portion 2 of the nipple, and an outer flange 8 fitting in a thimble 9 retained in the coupling member as by means of spinning over the end of the coupling as indicated at 11. The groove between the flanges 7 and 8 of the packing member 6 permits external atmospheric pressure to press said flanges against the surfaces of the nipple and thimble and thereby render the packing self-tightening. The same pressure also tends to force the packing member 6 down on its seat in the socket member and against a sealing ring 12 which is formed on said seat to facilitate the self-sealing action of the packing member.

The nipple 1 is provided with an inclined circumferential shoulder 13, and an annular expansible locking member 14 here shown in the form of a spiral spring is mounted in the socket 10 in position to engage said shoulder 13 when the parts are in coupled relation. The thimble 9 is provided with an inwardly inclined portion 15 adjacent the outer end thereof which is adapted to bear on the locking member 14 and wedge the same into locking engagement with the shoulder 13 of the nipple when it is attempted to withdraw the nipple from the socket.

A spacing member in the form of a dished washer 10 is slidably mounted in the thimble 9 between the locking member 14 and the packing member 6, and is so dimensioned as to cause a slight compression of the packing member 6 when the locking member 14 is in operative position whereby it is yieldably retained in such position.

Means for moving the locking member 14 out of its locking position is provided in the form of a releasing sleeve 16 slidably mounted on the nipple 1 and having a radially extending flange 17 whereby the member may be manually operated to raise the locking member 14 out of engagement with the shoulder 13 as illustrated in Fig. 2. Suitable means such as an abutment member 18 is preferably provided for limiting the sliding movement of the releasing member 16 away from the shoulder 13.

In the operation of the device, to couple the members together, it is merely necessary to insert the nipple 1 in the socket member 3 until the locking member 14 snaps into locking position back of the shoulder 13, whereupon the parts are locked together and the joint therebetween is sealed by the elasticity of the packing member 6 and by the action of external pressure thereon as above set forth. When in this position, attempts to withdraw the nipple merely result in the member 14 being wedged more tightly against the shoulder 13 by the inclined portion 15 of thimble 9, and bending stresses on the coupling are effectively resisted by the bearing 5 and spacing member 10 which cooperate with the cylindrical portion 2 of the nipple to maintain the nipple aligned in the socket.

When it is desired to remove the nipple, it is merely necessary to press the flange 17 of the releasing member 16 toward the socket 3, whereupon the member 14 is cammed out of locking position as shown in Fig. 2, whereupon the nipple may be freely withdrawn. It will be noted that the unlocking movement of the member 14 is resisted by the compression of the packing member 6 as indicated in Fig. 2 so that accidental dislodgment of the locking member is effectively prevented.

Although but one form of the invention has been shown and described in detail, it will be understood that other embodiments are possible and various changes may be made in the design and arrangement of the parts without departing from the spirit of the invention as defined in the claims appended hereto.

What is claimed is:

1. In a vacuum hose coupling, a nipple having a smooth cylindrical portion, a socket having a bore for receiving the nipple and a yielding packing member in the form of a laterally grooved ring having a flange bearing on the nipple, and means in the socket for locking the nipple therein, said means being biased to locking position by the expansive action of the packing member.

2. In a vacuum hose coupling, a nipple having a smooth cylindrical portion, a socket having a bore for receiving the nipple and a yielding packing member in the form of a laterally grooved ring having a flange bearing on the nipple, said nipple having a circumferential shoulder, an annular member in the socket adapted to engage said shoulder and lock the nipple in the socket, and means cooperating with the yielding packing member for wedging the annular member into locking position.

3. In a quick detachable coupling for vacuum hose lines, a tubular nipple, a socket formed to receive the nipple, a yielding packing ring having flanges bearing on the nipple and in the interior of the coupling and actuated by external atmospheric pressure to seal therewith, means for locking the nipple in the socket, and means actuated by compression of said packing for yieldingly urging said locking means into operative position.

4. In a quick detachable hose coupling for vacuum lines, a nipple having a cylindrical surface and a circumferential shoulder, a socket formed with a bearing for the cylindrical surface and an annular locking member in said socket for engaging said shoulder to retain the nipple therein, yielding packing means in the socket bearing on the cylindrical portion of the nipple and arranged to be pressed down onto the nipple by external atmospheric pressure, said socket having means cooperating with said packing means for forcing the locking member against the shoulder, and a sleeve on the nipple manually operable to move the locking member out of engagement with the shoulder of the nipple and thereby release the nipple.

5. In a quick detachable hose coupling for vacuum lines, a nipple having a cylindrical surface and a circumferential shoulder, a socket formed with a bearing for the cylindrical surface, an annular expansible locking member in said socket for engaging said shoulder to retain the nipple therein, a yielding channeled packing member having flanges forming a sealing engagement with the socket and nipple, and means including a thrust member in the socket actuated by said packing member to yieldably press the locking member into locking position.

6. In a quick detachable tube coupling, a nipple having an enlarged cylindrical terminal portion defined by an annular shoulder, a socket having a bearing portion receiving the terminal portion of the nipple, a channel-shaped yielding packing member in the socket operable by external pressure to seal the bearing between the nipple and socket, a locking member in the socket, and means operable by expansion of said packing member for urging the locking member into engagement with the shoulder on the nipple.

WILLIAM L. McGRATH.